United States Patent [19]

Jan ter Bals

[11] Patent Number: 4,572,354

[45] Date of Patent: Feb. 25, 1986

[54] CONVEYING APPARATUS

[75] Inventor: Berend Jan ter Bals, Zaandam, Netherlands

[73] Assignee: Weimar N.V., Curacao, Netherlands Antilles

[21] Appl. No.: 606,181

[22] Filed: May 2, 1984

[30] Foreign Application Priority Data

May 11, 1983 [BE] Belgium .................................. 210747

[51] Int. Cl.⁴ .............................................. B65G 21/10
[52] U.S. Cl. ..................................... 198/592; 198/594
[58] Field of Search ............... 198/369, 586, 592, 594, 198/778; 414/139, 144, 145

[56] References Cited

U.S. PATENT DOCUMENTS

| 2,696,900 | 12/1954 | Finstead | 198/594 X |
| 3,534,872 | 10/1970 | Roth et al. | 198/594 X |
| 4,194,616 | 3/1980 | Barthelemy et al. | 198/778 |
| 4,203,512 | 5/1980 | Ammeraal | 198/778 X |

FOREIGN PATENT DOCUMENTS

| 2824505 | 12/1979 | Fed. Rep. of Germany | 198/778 |
| 8119173 | 12/1981 | Fed. Rep. of Germany | 198/778 |
| 7507338 | 12/1976 | Netherlands | 414/144 |

Primary Examiner—Joseph E. Valenza
Assistant Examiner—Lyle Kim
Attorney, Agent, or Firm—Kane, Dalsimer, Kane, Sullivan and Kurucz

[57] ABSTRACT

The invention relates to a conveying apparatus, in particular for loading and/or unloading ships, comprising a helical belt conveyor for the transport along a helical path, which helical belt conveyor has an at least substantially vertical central shaft and is provided with at least one endless conveyor belt, said conveyor belt having an upper run which follows a helical path, the apparatus further including an upper feed or discharge conveyor and a lower discharge or feed conveyor. According to the invention the helical belt conveyor is rotatable through at least 360° about the centerline of the central shaft, while the upper feed or discharge conveyor comprises an end conveyor, which is movable with respect to the main portion of the upper feed or discharge conveyor, the free end of this end conveyor continuously joining the upper run of the (upper) endless conveyor belt of the helical belt conveyor.

12 Claims, 6 Drawing Figures

CONVEYING APPARATUS

The invention relates to a conveying apparatus, in particular for loading and/or unloading ships, comprising a helical belt conveyer for the transport along a helical path, which helical belt conveyor has an at least substantially vertical central shaft and is provided with at least one endless conveyor belt, said conveyor belt having an upper run which follows a helical path; the apparatus further including an upper feed or discharge conveyor and a lower discharge or feed conveyor.

In a known embodiment of a conveying apparatus of this type the helical belt conveyor may be displaced upwardly and downwardly and/or parallel to itself by means of a crane or the like, while the end of the upper feed or discharge conveyor joins the upper end portion of the helical belt conveyor always at the same location.

It is an object of the present invention to provide a conveying apparatus, which offers further possibilities in respect of the movement of the helical belt conveyor.

For this purpose the conveying apparatus according to the invention is characterized in that the helical belt conveyor is rotatable through at least 360° about the centerline of the central shaft, while the upper feed or discharge conveyor comprises an end conveyor, which is movable with respect to the main portion of the upper feed or discharge conveyor, the free end of this end conveyor continuously joining the upper run of the (upper) endless conveyor belt of the helical belt conveyor.

Due to the rotatability of the helical belt conveyor simple possibilities are obtained for rotating the lower discharge or feed conveyor, e.g. in order to load or to unload a ship's hold in all directions. In spite of the possibility of rotation of the helical belt conveyor which results of course in that the upper feed or discharge conveyor does not join the upper end portion of the helical belt conveyor always at the same location, nevertheless a correct joint of the upper feed or discharge conveyor to the helical belt conveyor is obtained in each position of the helical belt conveyor due to the application of the end conveyor, which is movable with respect to the main portion of the upper feed or discharge conveyor.

Preferably the end conveyor can carry out an at least approximately vertical motion of translation.

Further the end conveyor may join the main portion of the upper feed or discharge conveyor through an intermediate conveyor.

In this embodiment the intermediate conveyor may be connected on the one side to the end conveyor and may pivot about an at least approximately horizontal axis with respect thereto, while said intermediate conveyor may be connected on the other side to the main portion of the upper feed or discharge conveyor and may pivot about an at least approximately horizontal axis with respect thereto.

According to an important embodiment of the conveying apparatus according to the invention the intermediate conveyor may comprise an extendible frame with end rollers, as well as an endless conveyor belt led over these end rollers and being provided with a tightening member.

The invention will hereafter be elucidated with reference to the drawing, which very schematically shows an embodiment of a conveying apparatus according to the invention by way of example.

Figure 1:
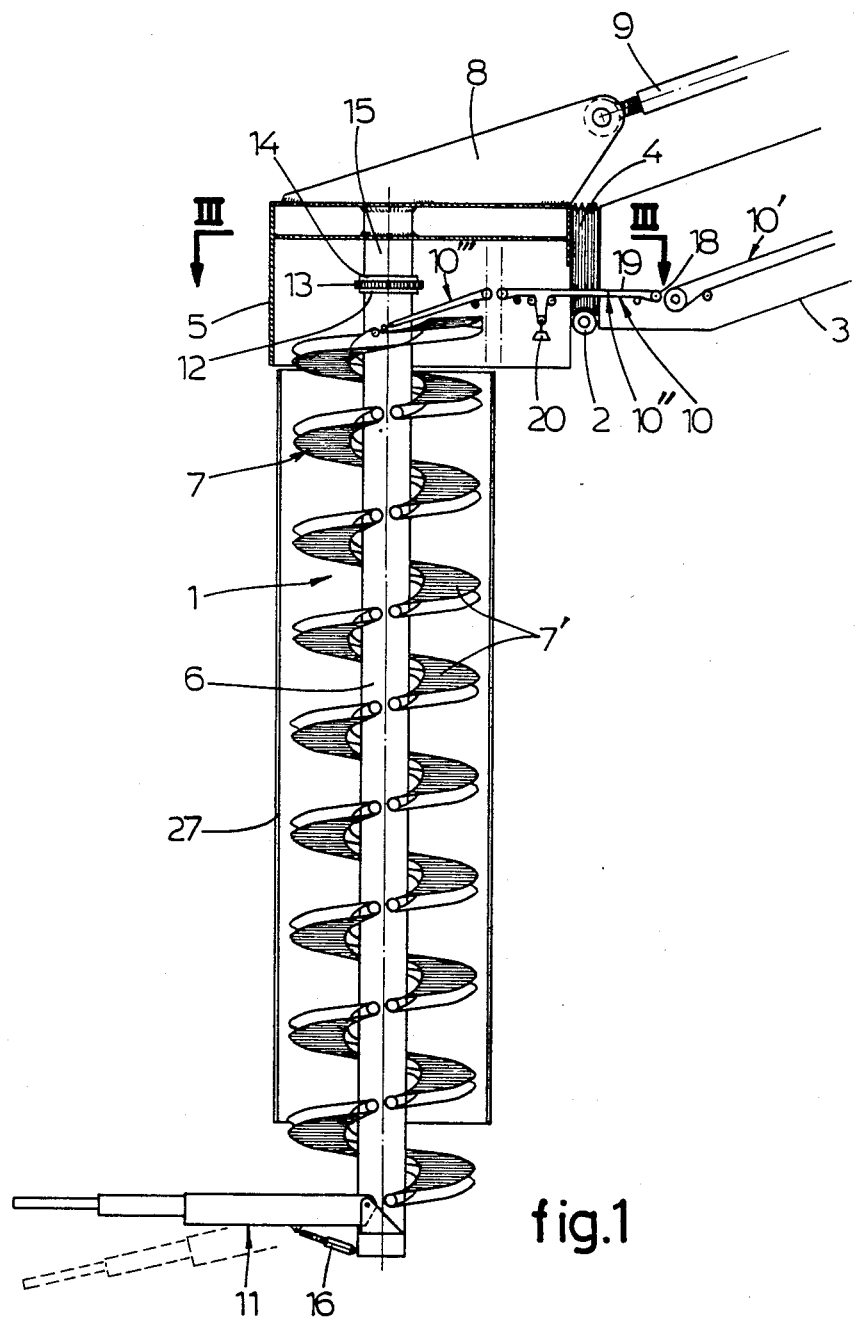
FIG. 1 shows an embodiment of a conveying apparatus according to the invention, partly in side view and partly in vertical section.
Figure 2:
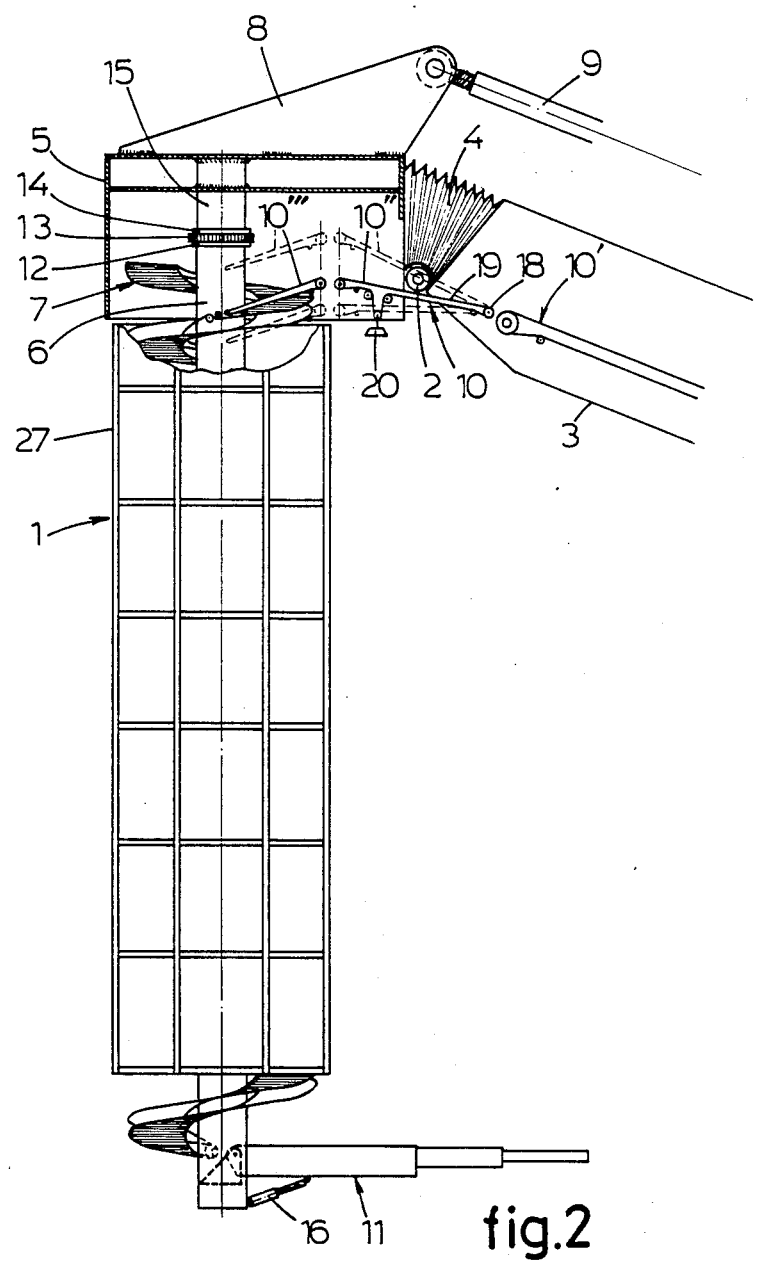
FIG. 2 shows the conveying apparatus according to FIG. 1 in a different position, partly in side view and partly in vertical section.
Figure 3:
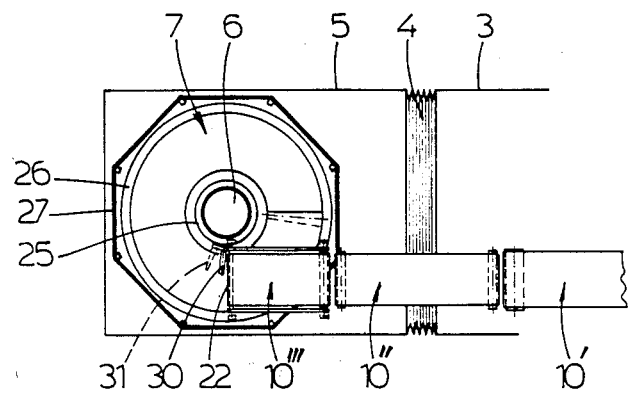
FIG. 3 is a cross-section according to the plane III—III in FIG. 1.
Figure 6:
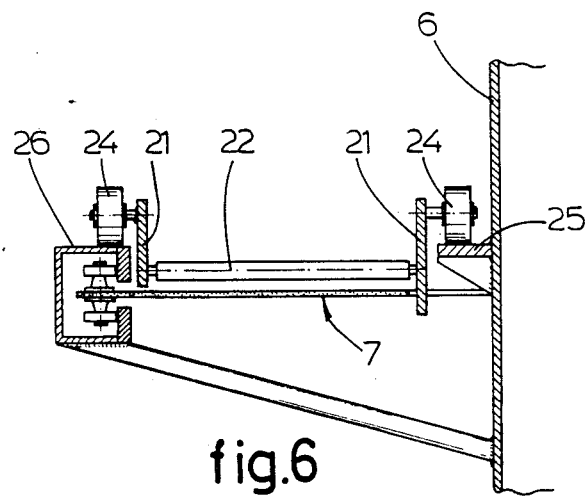
FIG. 6 is a section along the plane VI—VI in FIG. 4.

The drawing shows an embodiment of a conveying apparatus according to the invention by way of example. This conveying apparatus is particularly suitable for loading and/or unloading a ship's hold, but may of course be used for other applications.

The conveying apparatus comprises a helical belt conveyor 1 for the transport along a helical path. This belt conveyor 1 is suspended from a supply or discharge case 3, which is only partly shown, and may pivot about a horizontal axis 2 with respect thereto. This supply or discharge case 3 is connected to a crane construction (not shown) and may pivot about a horizontal axis with respect thereto. The supply or discharge case 3 carries the belt conveyor 1. The supply or discharge case 3 is connected to an upper portion 5 of the casing of the helical belt conveyor 1 by means of a bellows 4.

The helical belt conveyor 1 comprises an at least approximately vertical central shaft 6 and is further provided with a plurality of driven endless conveyor belts 7 which join each other. The upper runs 7' of these endless conveyor belts 7 follow helical paths which join each other, and which end at the lower and upper sides along at least approximately horizontal generating lines.

Upon an adjustment of the supply or discharge case 3 the central shaft 6 remains at least approximately vertical due to the fact that the upper portion 5 of the casing of the helical belt conveyor 1 is provided with support plates 8, while a rod 9 is journalled between these support plates 8 and may pivot about a horizontal axis, which rod 9 is parallel to the supply or discharge case 3, while the other end (not shown) of this rod is connected to the crane construction and may pivot about a horizontal axis with respect thereto just like this supply or discharge case 3, in such a way that the horizontal pivot axes on both sides of the rod 9, as well as the horizontal pivot axes on both sides of the supply or discharge case 3 lie on the angular points of a parallelogram.

The conveying apparatus further comprises a driven upper feed or discharge conveyor 10 and a driven lower discharge or feed conveyor 11.

This lower discharge or feed conveyor 11 is connected to the helical belt conveyor 1 and is rotatable together with this belt conveyor through at least 360° about the centerline of the central shaft 6.

In general the conveying apparatus will be executed in such manner, that the helical belt conveyor 1 and the lower discharge or feed conveyor 11 are rotatable together in the two opposite directions.

The central shaft 6 of the helical belt conveyor 1 is fixed at the upper side to the coaxial outer race 13 of a bearing construction, such as a ball bearing, by means of an upper flange 12 connected to the central shaft. This outer race 13 is provided with external teeth and forms a drive gear, which may be driven by means of a drive member (not shown).

The inner race of the bearing construction is connected to the lower flange 14 of a stationary support shaft 15, which is aligned with the central shaft 6 and which is welded to the upper portion 5 of the casing of the helical belt conveyor 1.

Therefore, the helical belt conveyor 1 and the lower discharge or feed conveyor 11 connected thereto, may be rotated about the centerline of the central shaft 6 by means of the drive member and the drive gear formed by the outer race 13.

In the embodiment shown by way of example the lower discharge or feed conveyor 11 is of a telescopic construction and is connected to the central shaft 6 of the helical belt conveyor 1 and may pivot about a horizontal axis with respect thereto. The lower discharge or feed conveyor 11 may be pivoted from its position shown in FIG. 1 in full lines in the upward and downward direction by means of a cylinder piston assembly 16, or another adjusting member.

While the joint of the lower discharge or feed conveyor 11 to the lower end of the helical belt conveyor 1 does not lead to any problems, as the helical belt conveyor 1 is rotated together with the lower discharge or feed conveyor 11, a correct joint of the upper feed or discharge conveyor 10 to the upper run 7' of the upper endless conveyor belt 7 of the helical belt conveyor 1, necessitates special measures.

In the embodiment shown in the drawings by way of example the driven main portion 10' of the upper feed or discharge conveyor 10 joins a driven end conveyor 10''' through a driven intermediate conveyor 10''. This driven end conveyor 10''' can carry out an at least approximately vertical motion of translation, while its free end continuously joins the upper run 7' of the upper endless conveyor belt 7 of the helical belt conveyor 1.

The intermediate conveyor 10'' is connected at its one side to the main portion 10' of the upper feed or discharge conveyor 10 and may pivot about an at least substantially horizontal axis with respect thereto, while the intermediate conveyor 10'' is connected at its other side to the end conveyor 10''' and may pivot about an at least substantially horizontal axis with respect thereto.

The intermediate conveyor 10'' comprises an extendible frame 17 with end rollers 18, as well as a driven endless conveyor belt 19, which is led over the end rollers 18 and which is continuously tightened by means of a tightening weight 20.

Figure 4:
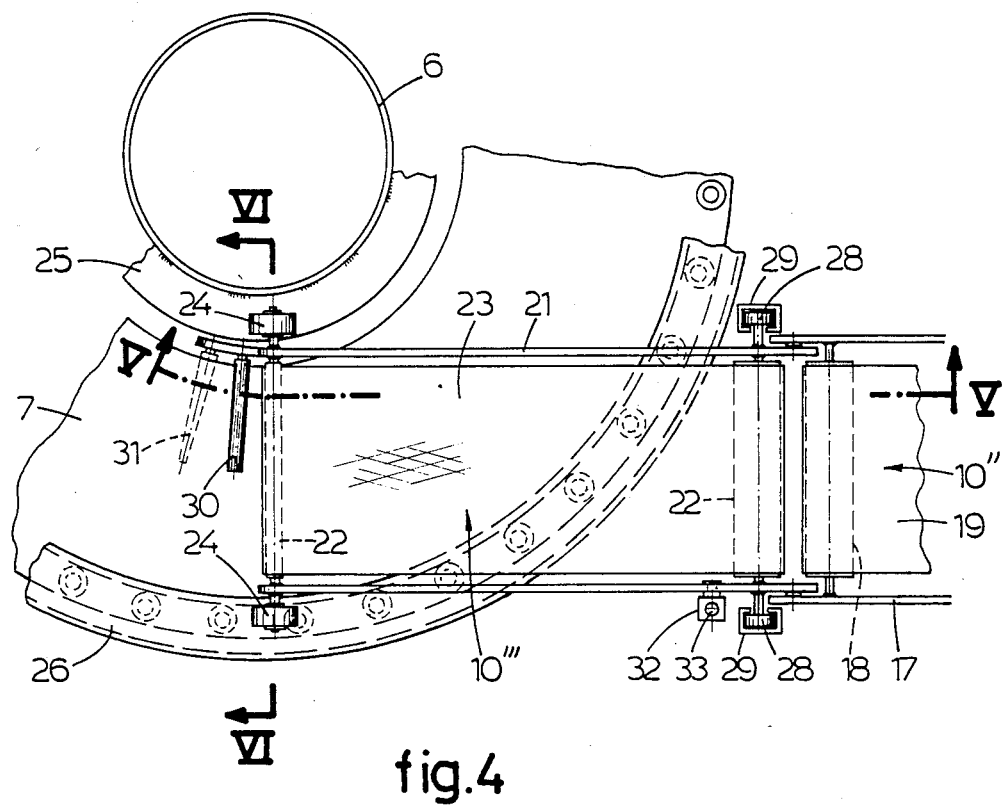
FIG. 4 is a partial plan view of the conveying apparatus according to FIG. 1 on a larger scale.
Figure 5:
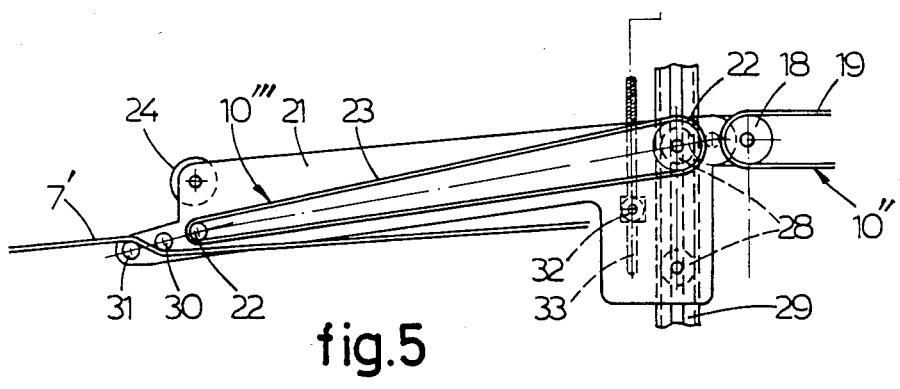
FIG. 5 is a section along the plane V—V in FIG. 4.

The end conveyor 10''' also comprises a frame 21 with end rollers 22 as well as a driven conveyor belt 23 which is led over the end rollers 22. This frame 21 is provided on both sides with support rollers 24 near the free end of the end conveyor 10'''. These support rollers rest on helical rails 25 and 26 and may be displaced by these helical rails, which are supported by the central shaft 6 of the helical belt conveyor 1 and which, upon rotation of the helical belt conveyor 1 about the centerline of the central shaft 6, follow this rotating movement. As shown in FIG. 4 the rail 26 also serves for guiding the outer edges of the endless conveyor belts 7.

The helical belt conveyor 1 is provided with an external guard frame 27, which is also supported by the central shaft 6 and which follows the rotation thereof.

Furthermore the frame 21 of the end conveyor 10''' carries on either side two guide rollers 28 near its pivotal connection with the intermediate conveyor 10''. These guide rollers 28 may be moved upwardly and downwardly in an at least approximately vertical guide member 29 in order to bring about that this end conveyor 10''' always encloses the same angle with the horizontal plane.

As an alternative for the construction shown in the drawings it is also possible to pivotally connect the end conveyor 10''' directly to the main portion 10' of the upper feed or discharge conveyor 10.

The frame 21 of the end conveyor 10''' further carries two at least approximately horizontal guide members 30, 31 at a small distance beyond the end roller 22 positioned at the free end of the frame 21. One of these guide members 30, 31 is situated on the upper run 7' of the upper endless conveyor belt 7 of the helical belt conveyor 1, while the other guide member lies underneath this upper run 7' of the upper endless conveyor belt 7 of the helical belt conveyor. In this way the upper run 7' obtains a course which joins the end conveyor 10'''.

The frame 21 of the end conveyor 10''' carries a nut 32, which is mounted on an at least approximately vertical screw spindle 33. This screw spindle 33 is coupled with the drive member and brings about that the end conveyor 10''' is displaced upwardly or downwardly simultaneously with the rotation of the helical belt conveyor 1, in order to maintain its correct joint to the upper run 7' of the upper endless conveyor belt 7 of the helical belt conveyor 1.

This automatic displacement of the end conveyor 10''' is of particular interest for the upward displacement thereof, as this displacement, if only obtained by the cooperation of the support rollers 24 and the rails 25, 26 in combination with the guide members 29 and the guide rollers 28, could lead to jamming.

The conveying apparatus according to the invention has the important advantage that the lower discharge or feed conveyor 11 may be rotated into each required position, without any difference in height occurring therewith. Further the joint between the upper feed or discharge conveyor 10 and the upper run 7' of the upper endless conveyor belt 7 of the helical belt conveyor 1 is effectively ensured in each angular position of this helical belt conveyor 1.

The invention is not restricted to the embodiment shown in the drawing by way of example, which may be varied in several ways within the scope of the appended claims.

I claim:

1. A conveying apparatus in particular for loading and unloading ships, comprising:
   a helical conveyor for transport along a helical path which helical conveyor is rotatable through at least 360 degrees about a centerline of a substantially vertical central shaft;
   a lower discharge and feed conveyor; and
   an upper feed and discharge conveyor comprising a main portion, an extendible intermediate conveyor, an end conveyor and mounting means for mounting said end conveyor; the intermediate conveyor interconnecting the main portion to the end conveyor and being connected on one side to the main portion and being pivotable about a first substantially horizontal axis with respect thereto; the immediate conveyor being connected on another side to the end conveyor and being pivotable about a second substantially horizontal axis with respect thereto; the end conveyor having a free end adjacent the helical conveyor; said mounting means permitting said end conveyor to be translatable only in a substantially vertical direction to maintain a substantially constant angle between said end conveyor and said endless conveyor.

2. Conveying apparatus according to claim 1, wherein the helical conveyor is rotatable in two opposite directions.

3. Conveying apparatus according to claim 1, wherein the intermediate conveyor comprises an extendible frame with end rollers, as well as an endless conveyor belt led over these end rollers and being provided with a tightening member.

4. Conveying apparatus according to claim 3, wherein said mounting means comprises a frame with end rollers, an endless conveyor belt being led over these end rollers, said frame further comprising support rollers near the free end of the end conveyor, which rest on helical rails, said rails are supported by the central shaft of the helical conveyor.

5. Conveying apparatus according to claim 4, wherein the frame of the end conveyor carries two guide rollers on either side near its pivotal connection with the intermediate conveyor, which pairs of guide rollers may each be moved upwardly and downwardly in an at least approximately vertical guide member.

6. Conveying apparatus according to claim 5, wherein the frame of the end conveyor carries two at least approximately horizontal guide means, at a small distance beyond the end roller positioned at the free end of the end conveyor, the first guide means being situated on and the second guide means being situated underneath the upper run of an (upper) endless conveyor belt of the helical conveyor, so as to give this conveyor belt a course, which joins the end conveyor.

7. Conveying apparatus according to claim 6, wherein the central shaft of the helical belt conveyor is fixed at its upper side to a coaxial, rotatably supported drive gear.

8. Conveying apparatus according to claim 7, further comprising an adjusting means, which adjusts the end conveyor simultaneously with the rotation of the helical belt conveyor.

9. Conveying apparatus according to claim 8 wherein the frame of the end conveyor carries a nut, which is mounted on an at least approximately vertical screw spindle which is rotated simultaneously with said helical belt conveyor.

10. Conveying apparatus according to claim 1, wherein the lower discharge or feed conveyor follows the rotating movement of the helical conveyor.

11. Conveying apparatus according to claim 10, wherein the lower discharge or feed conveyor is fixed to the central shaft of the helical conveyor.

12. Conveying apparatus according to claim 11, wherein the lower discharge and feed conveyor is fixed to the central shaft of the helical conveyor and may pivot about a horizontal axis with respect thereto, while said lower discharge or feed conveyor may be swung in the upward or downward direction from a horizontal position by means of a cylinder and piston assembly or the like.

* * * * *